US008120509B2

(12) United States Patent
Young

(10) Patent No.: US 8,120,509 B2
(45) Date of Patent: Feb. 21, 2012

(54) MWD DATA TRANSMISSION

(75) Inventor: Allen Richard Young, Houston, TX (US)

(73) Assignee: Multi-Shot LLC, Conroe, TX (US)

( * ) Notice: Subject to any disclaimer, the term of this patent is extended or adjusted under 35 U.S.C. 154(b) by 692 days.

(21) Appl. No.: 12/288,354

(22) Filed: Oct. 17, 2008

(65) Prior Publication Data

US 2009/0115625 A1    May 7, 2009

Related U.S. Application Data

(60) Provisional application No. 60/980,574, filed on Oct. 17, 2007.

(51) Int. Cl.
*G01V 1/40* (2006.01)
*G01V 3/00* (2006.01)
(52) U.S. Cl. ................ 340/854.4; 340/854.6; 367/81
(58) Field of Classification Search .............. 340/854.4, 340/854.6; 367/81, 83; 175/40
See application file for complete search history.

(56) References Cited

U.S. PATENT DOCUMENTS

| | | | | |
|---|---|---|---|---|
| 5,519,668 | A * | 5/1996 | Montaron | 367/35 |
| 6,909,667 | B2 * | 6/2005 | Shah et al. | 367/83 |
| 7,151,466 | B2 | 12/2006 | Gabelmann et al. | |
| 7,573,397 | B2 * | 8/2009 | Petrovic et al. | 340/854.6 |
| 7,894,302 | B2 * | 2/2011 | Aiello et al. | 367/83 |
| 2003/0151977 | A1 * | 8/2003 | Shah et al. | 367/82 |
| 2007/0247328 | A1 | 10/2007 | Petrovic et al. | |
| 2007/0247329 | A1 | 10/2007 | Petrovic et al. | |
| 2008/0136665 | A1 * | 6/2008 | Aiello et al. | 340/856.3 |
| 2010/0328096 | A1 * | 12/2010 | Hache et al. | 340/854.4 |
| 2011/0114387 | A1 * | 5/2011 | Belcher et al. | 175/57 |

* cited by examiner

*Primary Examiner* — William P Neuder
(74) *Attorney, Agent, or Firm* — Winstead PC

(57) ABSTRACT

An MWD data transmission system and method for determining and transmitting the environmental properties of the downhole borehole assembly (BHA) to surface data receivers via mud pulse telemetry, EM telemetry, or both mud pulse telemetry and EM telemetry based on one or more determined properties of the downhole environment.

8 Claims, 1 Drawing Sheet

MWD DATA TRANSMISSION

CROSS REFERENCE TO RELATED APPLICATION

The present application claims priority to U.S. Provisional Application Ser. No. 60/980,574, filed Oct. 17, 2007. This provisional application is incorporated by reference herein in its entirety.

FIELD OF INVENTION

The present invention relates in general to equipment for drilling operations and more specifically, but not by way of limitation to a system and method with an advanced detection capability for MWD (measurement while drilling) data transmission from a downhole borehole assembly (BHA) to surface data receivers.

BACKGROUND OF INVENTION

Mud pulse telemetry and electromagnetic (EM) telemetry are MWD methods. Each of these methods has its own shortcomings in achieving robust data telemetry. Mud pulse telemetry suffers most in conditions including, but not limited to under-balanced drilling where drilling mud may be of foam or gel consistency, drilling jobs where flow rates are very low, resulting in low pressure drops, and non-ideal conditions with poor mud pumps and/or pulsation dampeners. EM telemetry, on the other hand, suffers from conditions such as high attenuation in salt-saturated formations, and formations of high resistivity contrast.

For the aforementioned reasons, there is a need in the art for a system and method that provides advanced detection capability for MWD data transmission from a downhole borehole assembly (BHA) to surface data receivers by reducing the performance variance of mud pulser and EM telemetry from one field to another, or from one well to another, or even from one zone to another within the same well. The MWD data transmission system, as described herein, is uniquely suited to achieve these objectives.

SUMMARY OF THE INVENTION

The present invention relates in general to equipment for drilling operations. More particularly, one aspect includes a system that provides advanced detection capability for MWD (measurement while drilling) data transmission from a downhole borehole assembly (BHA) to surface data receivers. This MWD data transmission system includes a mud pulser to transmit the data via mud pulsery telemetry, a downhole transmitter for transmitting data via electromagnetic (EM) telemetry, sensors to determine the properties of the downhole environment and a processor communicatively coupled to the sensors, mud pulser and the downhole transmitter, such that the processor determines whether to transmit data via mud pulse telemetry, EM telemetry, or both mud pulse telemetry and EM telemetry based on one or more determined properties of the downhole environment.

According to another embodiment, the invention is MWD data transmission method for determining and transmitting the environmental properties of the downhole borehole assembly (BHA) to surface data receivers via mud pulse telemetry, EM telemetry, or both mud pulse telemetry and EM telemetry based on one or more determined properties of the downhole environment.

The foregoing has outlined some of the features and technical advantages of the present invention in order that the detailed description of the invention that follows may be better understood. Additional features of the invention will be described herein after which form the subject of the claims of the invention.

BRIEF DESCRIPTION OF THE DRAWINGS

A more complete understanding of the system of the present invention may be obtained by reference to the following Detailed Description when taken in conjunction with the accompanying Drawings wherein.

DETAILED DESCRIPTION OF THE INVENTION

Figure 1:
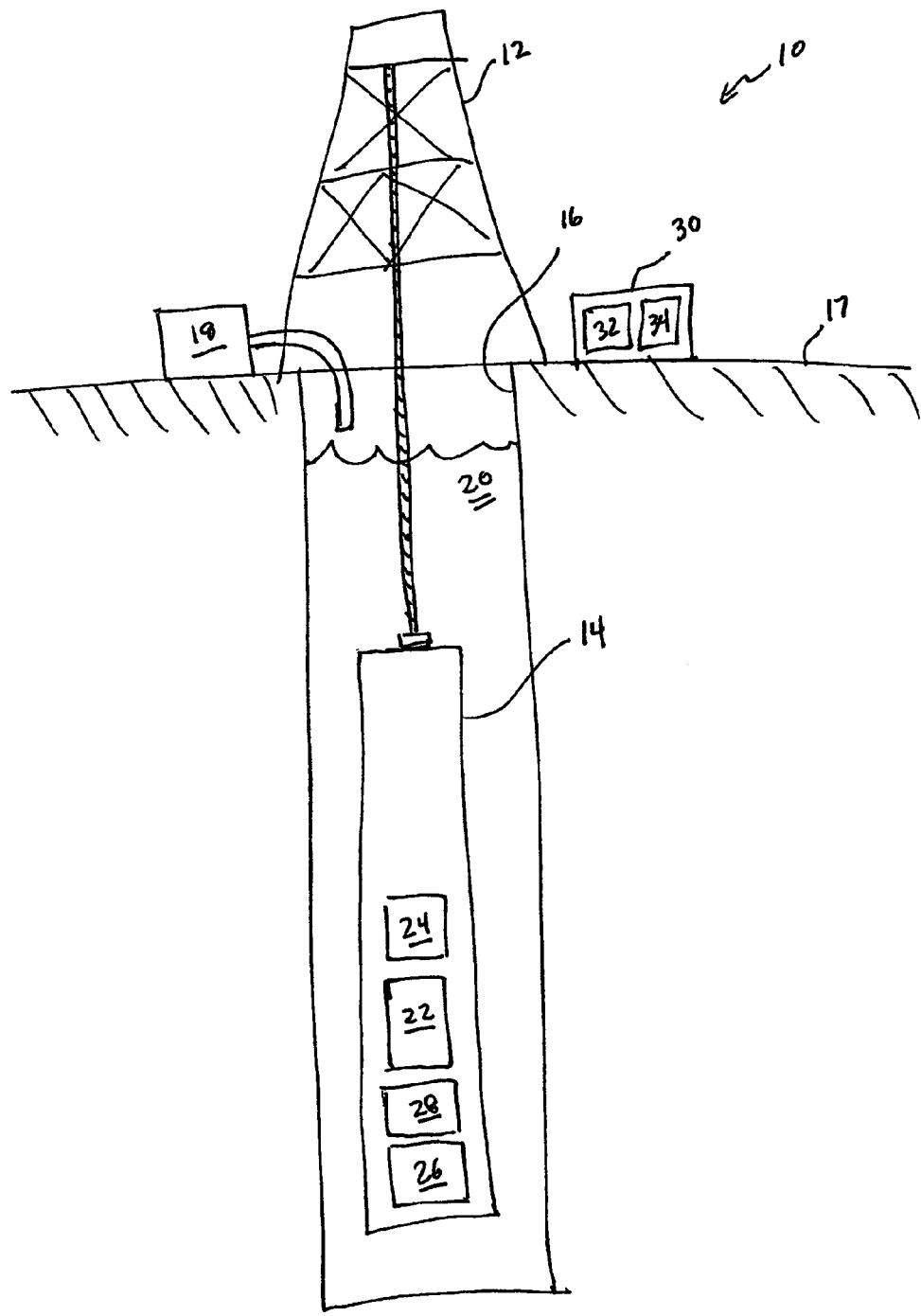
FIG. 1 shows an illustrated embodiment of MWD data transmission system of the present invention.

In the following detailed description, reference is made to the accompanying drawings that show, by way of illustration, specific embodiments in which the invention may be practiced. These embodiments are described in sufficient detail to enable those skilled in the art to practice the invention. It is understood that the various embodiments of the invention, although different, are not mutually exclusive. For example, a particular, feature, structure, or characteristic described herein in connection with one embodiment may be implemented within other embodiments without departing from the spirit and scope of the invention. In addition, it is understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with a full range of equivalents to which the claims are entitled. In the drawings, like numerals refer to the same or similar functionality throughout the several views.

FIG. 1 shows an example of a system for MWD data transmission, indicated generally by the numeral 10 which illustrates a typical drilling installation including a drilling rig 12, constructed at the surface of the well to position the downhole assembly (BHA) 14. BHAs typically includes drill collars, a MWD tool, and a drill bit for penetrating through earth formations to create the borehole 16 in the rock formation 17. In operation, the weight applied through the drill collars to the drill bit permits the drill bit to crush and make cuttings in the underground formations. BHA 14 includes mud pulser 26 to transmit mud pulse signals via drilling mud 20. BHA 14 also includes downhole transmitter 28 to transmit EM signals. BHA 14 may include sensors 22 and processor 24 to determine downhole conditions and process this data. Rig 12 may include mud pump 18 to fill borehole 16 with substantial quantities of drilling fluid (commonly referred to as "drilling mud") 20. The drilling mud discharged functions to cool and lubricate the drill bit, and to carry away earth cuttings made by the bit. After flowing through the drill bit, the drilling fluid rises back to the surface, where it is collected and returned to a mud pit for filtering.

This circulating column of flowing drilling mud may act as a medium for transmitting pressure pulse wave signals (mud-based telemetry) from the BHA to the surface. Mud-based telemetry has been used extensively and traditionally has been the most reliable way to communicate information from downhole. Mud-based telemetry devices however provide a relatively narrow bandwidth of information as there is significantly more information which could be desirable on a real-time or near real-time basis. Additionally, mud-based telemetry devices only operate when mud is flowing. Stoppage of drilling therefore, unfortunately eliminates one of the most reliable channels of communication, though providing an opportunity for utilizing another significantly improved bandwidth on any channel due to the reduce noise level downhole.

One such medium is electromagnetic telemetry where the earth functions as a medium for transmitting electromagnetic wave signals, carrying information from the downhole environment to the surface. Electromagnetic telemetry is able to function in situations where mud-based telemetry can not, for example when mud is not flowing or in under balanced drilling environments (such as drilling with foams) where the lower density drilling fluids either have greatly reduced bandwidth or none at all for mud-based telemetry. Electromagnetic telemetry systems find application in regions of consistently low conductivity, foam drilling applications (where mud pulse telemetry systems are of little use), and in systems requiring telemetry when the mud pumps are not operating. Combining electromagnetic telemetry and mud-based telemetry could improve transmission by doubling the data rate.

System 10 includes uphole receiver system 30, which includes surface receiver 32 and surface decoder 34. Receiver system 30 receives and decodes mud pulse signals transmitted from mud pulser 26 and/or EM signals transmitted by downhole transmitter 28 of the downhole BHA 14. Based on this analysis and decoding, system 10 automatically, or on demand, transmits data via (1) EM only, (2) mud pulser only or (3) EM/mud pulser simultaneously.

In one example, processor 24 is connected to sensors 22, mud pulser 26 and transmitter 28 and dynamically analyzes the downhole conditions to determine whether EM telemetry or mud pulse telemetry is the most effective form of telemetry. The sensors are selected and adapted as required for the particular drilling operation, to measure such downhole parameters as the downhole pressure, the temperature, the resistivity or conductivity of the drilling mud or earth formations, and the density and porosity of the earth formations, as well as other downhole conditions. For example, tool 14 may transmit sensor data for the downhole conditions to a uphole receiver system 30. A user or uphole receiver system 30 may then make a determination of whether to switch modes based on this received sensor data. For example, uphole receiver system 30 may automatically make this determination based whether the downhole conditions meet one or more predetermined thresholds, e.g., these thresholds correspond to whether EM telemetry or mud pulse telemetry is the most effective form of telemetry. Once a user or uphole receiver system 30 makes the decision to switch modes between EM or the mud-pulse transmission, instructions to switch modes are transmitted to tool 14.

In another example, tool 14 itself may automatically determine whether to switch modes based on data received from sensors 22. For example, if sensors 22 determine high levels of salt in rock formation 17, processor 24 may instruct BHA 14 to transmit data via mud pulse signals instead of EM telemetry. Similarly, if sensors 22 indicate that the flow rate of drilling mud 20 is low, then processor 24 may instruct BHA 14 to transmit data via EM signals.

In another example, system 10 may determine whether to switch modes between EM or the mud-pulse transmission based on the strength or quality of signals received by uphole receiver system 30. For example, if the EM or mud pulse transmission do not meet a predetermined threshold for strength or quality, a user or uphole receiver system 30 may transmit instructions to tool 14 to switch transmission modes or implement simultaneous EM and mud pulse transmission. This combinatorial usage of signals transmitted via both methods, raises the likelihood that the correct signal interpretation will be achieved. Based on the determination of the sensors or the output received by the surface receiver 30, the processor 24 optimizes the data transmission rate by converting the transfer of information to a simultaneous EM and mud-based transmission mode. In this mode, the system 10 provides simultaneous usage of EM and mud pulse telemetry, and combinatorially uses these two disparate signals to interpret a single data stream from BHA 14 to surface receiver system 30. This is achieved by a switching mechanism in the BHA 14 capable of directing the data signal to either the EM transmitter or the mud pulser in response to a control signal generated by the surface receiver system 30.

Typically, simultaneously conducting EM and mud pulser telemetry effectively doubles power consumption compared to each method individually. In one example, system 10 uses simultaneous EM and mud pulser telemetry only during periods when each method is individually compromised to the extent that one method by itself would likely not be successful. For example, system 10 may simultaneously use both forms of telemetry if sensors 22 indicate both high levels of salt and poor mud flow rates. The net effect is that there can be a continuous flow of information allowing for a consistent gathering and sending of data to the surface receiver 30 without need to pull out the drill string.

Although various embodiments of the MWD data transmission system have been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth herein.

I claim:

1. A system for transmitting data concerning a downhole environment, the system comprising:
    a mud pulser to transmit data via mud pulse telemetry;
    a downhole transmitter to transmit data via electromagnetic (EM) telemetry;
    sensors to determine one or more properties of the downhole environment;
    a processor communicatively coupled to the sensors, mud pulser and the downhole transmitter, wherein the transmission of data via mud pulse telemetry, EM telemetry, or both mud pulse telemetry and EM telemetry is based on one or more determined properties of the downhole environment,
    wherein the processor receives a signal via a first telemetry type, the processor determines whether the signal meets a predetermined threshold for signal strength, and the processor switches to a second telemetry type if the signal does not meet the predetermined threshold for signal strength.

2. The system of claim 1 wherein data transmission via mud pulse, EM pulse or both is automatic or manually controlled by the processor.

3. The system of claim 1 wherein data transmission via mud pulse, EM pulse or both is controlled by an uphole operator.

4. The system of claim 1 wherein the predetermined threshold for signal strength is related to one or more downhole parameters.

5. The system of claim 4 wherein the one or more downhole parameters are pressure, temperature, resistivity, conductivity, density, or porosity.

6. A method for transmitting data, the method comprising the steps of:

determining one or more properties of a downhole environment;

transmitting data via mud pulse telemetry, EM telemetry, or both mud pulse telemetry and EM telemetry based on one or more determined properties of the downhole environment;

receiving a signal from a mud pulser via a first telemetry type;

determining whether a signal meets a predetermined threshold for signal strength; and switching to a second telemetry type if the signal does not meet the predetermined threshold for signal strength.

7. The method of claim 6 wherein the predetermined threshold for signal strength is related to one or more downhole parameters.

8. The method of claim 7 wherein the one or more downhole parameters are pressure, temperature, resistivity, conductivity, density, or porosity.

* * * * *